United States Patent Office 3,472,621
Patented Oct. 14, 1969

3,472,621
MOLYBDENUM DISELENIDE HAVING A RHOMBOHEDRAL CRYSTAL STRUCTURE AND METHOD OF PREPARING SAME
Meyer S. Silverman, Norristown, Pa., assignor to Pennsalt Chemicals Corporation, Philadelphia, Pa., a corporation of Pennsylvania
No Drawing. Filed July 9, 1965, Ser. No. 470,907
The portion of the term of the patent subsequent to May 28, 1985, has been disclaimed
Int. Cl. C01b $19/00$; C01g $39/00$
U.S. Cl. 23—204          11 Claims

ABSTRACT OF THE DISCLOSURE

Molybdenum diselenide having a rhombohedral crystal structure and useful as a specialty lubricant is prepared by subjecting a mixture of elemental molybdenum and selenium to the simultaneous effects of high heat and high pressure, i.e. a temperature of at least about 800° C. and a pressure of at least about 10 kilobars.

---

This invention relates to a new form of molybdenum diselenide and also to a method for preparing molybdenum diselenide. More particularly, this invention concerns a new compound of molybdenum and selenium having a rhombohedral crystal structure and the empirical formula $MoSe_2$, or expressed another way $Mo_nSe_{2n}$, and a unique, high temperature, synthesis technique for preparing molybdenum diselenide.

Molybdenum diselenide having an hexagonal crystal structure and a charcoal grey appearance is known. In accordance with this invention, it has been discovered that the molybdenum diselenide having the rhombohedral crystal structure as described herein is prepared by subjecting, in the preferred embodiment, a mixture of elemental molybdenum and elemental selenium to the combined action of extreme temperatures and pressures. The rhombohedral crystalline mloybdenum diselenide is a black, reflective, very soft, polycrystalline material. It has been discovered that heating the new rhombohedral form of $MoSe_2$ under reduced pressures, e.g., at from about 900 to about 1000° C., and under pressures of less than about 25 mm. of Hg abs., converts the product into the known, aforesaid, hexagonal crystal form of $MoSe_2$.

In alternative embodiments of the process, the starting materials used can be compounds which are precursors of the new molybdenum diselenide produced by the application of the heat and pressure, i.e. those compounds which form $MoSe_2$ in situ, for example, $MoO_3+Se$, $Mo+SeO_2$, $MoO_3+SeO_2$, and the hexagonal crystal form of $MoSe_2$.

The pressure used to produce the molybdenum diselenide according to this invention, in simultaneous combination with heat acting on a mixture of molybdenum and selenium, or a mixture of molybdenum and a precursor of selenium, or a mixture of selenium and a precursor of molybdenum, or a mixture of precursors that yield molybdenum diselenide in situ, is at least about 10 kilobars (one kilobar equals 986.92 atmospheres), preferably at least about 20 kilobars and more preferably at least about 40 kilobars. The use of pressures in excess of 80 kilobars serves no practical purpose since the small improvement in yield does not justify the extra effort required to attain such higher pressures.

As previously stated, the practice of this invention requires a combination of both pressure and elevated temperatures to convert the raw materials described above into the new rhombohedral crystalline form of molybdenum diselenide. A temperature of at least about 800° C. is necessary, at least about 1600° C. being preferred. The practical upper temperature limit is about 2500° C. The preferred range of operating temperatures is from about 1600° C. to about 2000° C. The product $MoSe_2$ will contain some hexagonal crystal form of the compound in addition to the desired rhombohedral crystal form when the synthesis is conducted in the lower range of temperatures, with an increase in temperature favoring the yield of the rhombohedral form. It has been found that at temperatures above about 1600° C., the product is essentially the rhombohedral crystal form.

The relative amounts of the aforesaid raw materials in the mixture subjected to the process of this invention are such as to provide an atomic ratio of molybdenum to selenium in the charge generally within the range of about 1:2 to about 1:4. Although an excess of selenium greater than the 4 moles Se to one mole Mo is possible, no advantage is gained, and if a purified product is desired more unreacted selenium must be removed. The preferred atomic ratio of Mo to Se is within the range of about 1:2 to about 1:3, and most preferable is a ratio of 1:2.2.

The reaction period, which is not critical, may vary from about 1 minute to 24 hours, although the reaction generally is completed in no more than about 5 minutes. Yields of from 75 to 100% of the rhombohedral crystal form of $MoSe_2$ are obtained without difficulty in the practice of this process with reaction periods of from about 2 to 5 minutes. Unreacted selenium, which is quite volatile, may be removed from the product, if so desired, by vacuum sublimation.

The apparatus used in the illustrative examples that follow is similar to that developed at the National Bureau of Standards and described in "Compact Multianvil Wedge Type High Pressure Apparatus," E. C. Lloyd, U. O. Hutton and D. P. Johnson in the Journal of Research of the National Bureau of Standards, vol. 63C, No. 1, July–September, 1959, pages 59–64. In place of the $9/16''$ tetrahedral sample holders used in the above reference, $5/8''$ holders with $1/2''$ anvil faces were employed in the examples which follow, and alternatively, $5/16''$ holders were used with $3/4''$ anvil faces. A polyester film ("Mylar" manufactured by Du Pont Company) was used between the anvil assemblies and the polytetrafluoroethylene sheet ("Teflon," manufactured by Du Pont Company). Additionally, a 0.003" wall boron nitride sleeve was used between the sample and the graphite heaters as electrical insulation. Force was applied to the tetrahedral anvil system by a Watson-Stillman 100-ton hydraulic laboratory press. Pressure calibration was done by measuring the electrical resistance change of bismuth samples. Pressure was measured as a function of ram force and the three discontinuities were considered to occur at 25.4, 27.0 and 82 kilobars. In all of the preparations, a thin sleeve of spectroscopic grade graphite was used as the heating element around the sample, and end plugs of the same material isolated the sample from the platinum or silvered tabs that carried the current from the anvils to the heating sleeve. Temperature calibrations were done by measuring the electrical power input required to obtain temperatures which were indicated by a Chromel-Alumel thermocouple, the tip of which was in good contract with the center of the graphite heating sleeve. The temperatures reported here are thus the highest to which any part of the sample was subjected, and it should be recognized that the ends of the sample in each case were somewhat cooler. Experience in repeated calibrations indicates that the temperature values are uncertain by approximately ±50° C., but the relative differences among the temperature levels of the experiment are believed to be quite reliable.

In each preparation the sample was first compressed in the high pressure apparatus, then heated, and held at the desired conditions for a measured period of time. The high pressure was then maintained until the power was turned off and the sample had cooled to nearly ambient temperature. Cooling was very rapid in all cases. The product was removed as a compressed cylindrical pellet.

EXAMPLE 1

A mixture of powdered molybdenum (99.8% purity, Fisher Scientific Company) and powdered selenium (technical grade, 99+ percent purity, 200 mesh, Harshaw Chemical Corporation), the ratio of these raw materials in said mixture being one gram-mole of molybdenum to 2.2 gram-moles of selenium, is charged to the above-described tetrahedral anvil apparatus. The mixture is compressed to a pressure of 45 kilobars and then rapidly heated to 1760° C. where it is held for 5 minutes. The electrical power is switched off to quickly quench the reaction. After a cooling period of about 5 minutes, the pressure is released to atmospheric and the product is found to be in the form of very soft, black reflective crystals, which product is elementally analyzed with the results Mo 34.0, Se 66.0, atomic ratio of Se/Mo=2.3, The product is thus essentially of the empirical formula $MoSe_2$ which theoretically consists of Mo 37.8, Se 62.2, atomic radio of Se/Mo=2.0, the discrepancy being due to a small amount of the excess, unreacted selenium in the product.

The X-ray diffraction pattern of the powdery, rhombohedral crystalline molybdenum diselenide prepared above is determined and compared to the X-ray powder diffraction pattern for the molybdenum diselenide having the hexagonal crystal structure as reported by P. B. James and M. T. Lavick, ACTA Crystallographica, vol. 16, p. 1183, Nov. 10, 1963. The comparison is set forth in Table I below:

TABLE I.—X-RAY DIFFRACTION POWDER PATTERNS OF MOLYBDENUM DISELENIDES

| Rhombohedral, $d$, A.: | Form I |
|---|---|
| 6.4 | 100 |
| 3.21 | 10 |
| 2.81 | 30 |
| 2.72 | 15 |
| 2.46 | 50 |
| 2.295 | 70 |
| 2.135 | 30 |
| 1.98 | 50 |
| 1.845 | 20 |
| 1.649 | 50 |
| 1.615 | 70 |
| 1.599 | 10 |
| 1.50 | 15 |
| 1.47 | <5 |
| 1.425 | 10 |
| 1.37 | 15 |
| 1.34 | 30 |
| 1.323 | 10 |
| 1.31 | 30 |
| 1.27 | 15 |
| 1.242 | 5 |
| 1.23 | 10 |
| 1.155 | 50 |

TABLE I—Continued

| Hexagonal, $d$, A.: | Form I |
|---|---|
| 6.44 | 78 |
| 3.225 | 6 |
| 2.839 | 63 |
| 2.788 | 6 |
| 2.617 | 7 |
| 2.369 | 100 |
| 2.151 | 10 |
| 1.914 | 39 |
| 1.641 | 49 |
| 1.615 | 13 |
| 1.591 | 10 |
| 1.464 | 2 |
| 1.422 | 8 |
| 1.352 | 13 |
| 1.306 | 6 |
| 1.246 | 8 |
| 1.152 | 33 |

"I" values are the relative intensity of the individual lines, relative to the strongest line in the pattern which is given the value of 100.

"$d$" in Angstrom units is the interplanar distance between lattice planes according to the Bragg Equation.

It is well known that X-ray spectographs uniquely characterize crystalline structures, and therefore, the above X-ray diffraction pattern for the new rhombohedral $MoSe_2$ is a definitive description of the compound.

A portion of the rhombohedral $MoSe_2$ prepared above is heated to 1000° C. in a vacuum (25 mm. Hg) and held under these conditions for 90 minutes, whereupon it is converted into the hexagonal crystal form of $MoSe_2$, as indicated by the X-ray diffraction pattern of the product.

EXAMPLES 2–11

The procedure described in Example 1 is followed employing the synthesis conditions summarized in Table II below. Reaction time is five minutes except for Example 10 in which it is 2.5 minutes.

TABLE II

| | Synthesis conditions | |
|---|---|---|
| Example No. | Pressure, kilobars | Temperature, ° C. |
| 2 | 17 | 850 |
| 3 | 79 | 820 |
| 4 | 26 | 925 |
| 5 | 57 | 1,100 |
| 6 | 79 | 1,170 |
| 7 | 70 | 1,395 |
| 8 | 40 | 1,400 |
| 9 | 46 | 1,760 |
| 10 | 62 | 2,000 |
| 11 | 70 | 2,020 |

The products are analyzed by their X-ray diffraction powder patterns which show that the molybdenum diselenide prepared in Examples 9–11 is substantially all of the rhombohedral crystal form. The products of the other examples are comprised of the rhombohedral crystal form together with some of the hexagonal crystal form of molybdenum diselenide. The electrical resistivity of the rhombohedral product of Example 10 is measured across two separate axes of the cylindrical pellet with a standard volt-ohmeter and found to be 0.16 to $0.48 \times 10^3$ ohm-cm.

The new form of molybdenum diselenide embodied herein is useful as a lubricant in systems involving metal to metal contact, and especially in an environment where the temperature is either too high or too low for conventional fluid lubricants. Moreover, the fact that the electrical resistivity of the hexagonal form of $MoSe_2$ is approximately five to fifty times that of the rhombohedral form or a mixture of the forms, combined with the property possessed by the rhombohedral form of conversion to the hexagonal form when heated to high temperatures as earlier described, gives the new rhombohedral compound a unique utility in the lubrication of metal components. In the event of overheating of the lubricated parts because of an overload or a deficiency of lubricant, the crystalline structure of the $MoSe_2$ lubricant would change form, which results in a marked decrease in the electrical resistivity of the material. The electrical resistivity is monitored by a detection device which picks up this signal change and alerts an operator to the overheating condition.

I claim:

1. A method for preparing molybdenum diselenide which comprises subjecting a mixture of molybdenum and selenium to a temperature of at least about 800° C. and a pressure of at least about 10 kilobars.

2. The method of claim 1 wherein the atomic ratio of molybdenum to selenium is from about 1:2 to about 1:4.

3. The method of claim 1 wherein the atomic ratio of molybdenum to selenium is about 1 to 2.2.

4. A method for preparing molybdenum diselenide which comprises subjecting a mixture of molybdenum and selenium to a temperature of at least about 1600° C. and a pressure of at least about 20 kilobars.

5. The method of claim 4 wherein the atomic ratio of molybdenum to selenium is from about 1:2 to about 1:4.

6. The method of claim 4 wherein the atomic ratio of molybdenum to selenium is about 1 to 2.2.

7. A method for preparing molybdenum diselenide which comprises subjecting a mixture of molybdenum and selenium to a temperature within the range of about 1600° C. to about 2500° C. and a pressure within the range of about 20 to about 80 kilobars.

8. The method of claim 7 wherein the temperature is within the range of about 1600° C. to about 2000° C.

9. The method of claim 8 wherein the atomic ratio of molybdenum to selenium is from about 1:2 to about 1:3.

10. The method of claim 8 wherein the atomic ratio of molybdenum to selenium is about 1 to 2.2.

11. Molybdenum diselenide having a rhombohedral crystal structure and the X-ray diffraction pattern with the lines essentially as follows:

| $d$, A. | I |
|---|---|
| 6.4 | 100 |
| 3.21 | 10 |
| 2.81 | 30 |
| 2.72 | 15 |
| 2.46 | 50 |
| 2.295 | 70 |
| 2.135 | 30 |
| 1.98 | 50 |
| 1.845 | 20 |
| 1.649 | 50 |
| 1.615 | 70 |
| 1.599 | 10 |
| 1.50 | 15 |
| 1.47 | <5 |
| 1.425 | 10 |
| 1.37 | 15 |
| 1.34 | 30 |
| 1.323 | 10 |
| 1.31 | 30 |
| 1.27 | 15 |
| 1.242 | 5 |
| 1.23 | 10 |
| 1.155 | 50 |

References Cited

UNITED STATES PATENTS

| 656,353 | 8/1900 | Jacobs | 23—204 |
| 934,379 | 9/1909 | Willson et al. | 23—204 |
| 3,352,640 | 11/1967 | Silverman | 23—204 |
| 3,375,071 | 3/1968 | Young | 23—204 |
| 3,385,667 | 5/1968 | Silverman | 23—204 |

OTHER REFERENCES

Bell et al.: "Journal of the American Chemical Society," vol. 79, pp. 3351–3354 (1957).

OSCAR R. VERTIZ, Primary Examiner

HOKE S. MILLER, Assistant Examiner

U.S. Cl. X.R.

23—50